US012657145B2

(12) United States Patent
Kasuya et al.

(10) Patent No.: US 12,657,145 B2
(45) Date of Patent: Jun. 16, 2026

(54) ELECTRONIC CONTROL DEVICE AND CALCULATION METHOD

(71) Applicant: HITACHI ASTEMO, LTD., Hitachinaka (JP)

(72) Inventors: Momoka Kasuya, Tokyo (JP); Hiroki Yamazaki, Tokyo (JP); Nobuyoshi Morita, Hitachinaka (JP); Shuhei Kaneko, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 926 days.

(21) Appl. No.: 17/777,398

(22) PCT Filed: Nov. 9, 2020

(86) PCT No.: PCT/JP2020/041785
§ 371 (c)(1),
(2) Date: May 17, 2022

(87) PCT Pub. No.: WO2021/100527
PCT Pub. Date: May 27, 2021

(65) Prior Publication Data
US 2022/0405226 A1      Dec. 22, 2022

(30) Foreign Application Priority Data
Nov. 19, 2019     (JP) ................................. 2019-208977

(51) Int. Cl.
*G06F 13/40* (2006.01)
*G06F 21/62* (2013.01)

(52) U.S. Cl.
CPC ...... *G06F 13/4022* (2013.01); *G06F 21/6209* (2013.01)

(58) Field of Classification Search
None
See application file for complete search history.

(56) References Cited

U.S. PATENT DOCUMENTS 9,792,440 B1 *   10/2017   Wang .................. H04L 63/1466
10,542,033 B2 *   1/2020   Otsuka ................ H04L 63/1408
(Continued)

FOREIGN PATENT DOCUMENTS

JP      2014-85905 A      5/2014
JP      2015-022521 A      2/2015
(Continued)

OTHER PUBLICATIONS

International Search Report with English translation and Written Opinion issued in corresponding application No. PCT/JP2020/041785 mailed Jan. 26, 2021.

*Primary Examiner* — Jeffrey R Swearingen
(74) *Attorney, Agent, or Firm* — Foley & Lardner LLP

(57)     ABSTRACT

An electronic control device includes: a first processing unit; a second processing unit; and a transfer control unit. The second processing unit requires a longer time for an activation process than the first processing unit, the transfer control unit includes a communication unit capable of transferring communication data received from an outside to the first processing unit and the second processing unit, the first processing unit includes a first control part that processes the communication data transferred from the transfer control unit, the second processing unit includes a second control part that processes the communication data transferred from the transfer control unit, and the transfer control unit does not set the second processing unit as a transfer destination of the communication data and sets the first processing unit to be included in the transfer destination until the activation process of the second processing unit is completed and sets at least the second processing unit as the transfer destination of the communication data when the activation process of the second processing unit is completed.

9 Claims, 14 Drawing Sheets

(56) References Cited

U.S. PATENT DOCUMENTS

| | | | | |
|---|---|---|---|---|
| 11,693,645 B2 * | 7/2023 | Sakurai | .................. | H04W 4/48 |
| | | | | 717/173 |
| 2010/0174895 A1 | 7/2010 | Pierce | | |
| 2017/0177872 A1 * | 6/2017 | McLean | ................ | H04L 9/0861 |
| 2018/0089436 A1 * | 3/2018 | Smith | .................. | H04L 9/3236 |
| 2018/0205414 A1 | 7/2018 | Tateishi | | |
| 2020/0211301 A1 * | 7/2020 | Zhang | .................. | H04L 63/065 |
| 2020/0213287 A1 * | 7/2020 | Zhang | .................. | H04L 63/123 |

FOREIGN PATENT DOCUMENTS

| | | | | | |
|---|---|---|---|---|---|
| JP | 2017121091 A | * | 7/2017 | ............ | H04L 63/08 |
| JP | 2018-116669 A | | 7/2018 | | |

* cited by examiner

| MAC ADDRESS | TRANSFER DESTINATION |
|---|---|
| 1A:2B:3C:4D:5E:6F | Port 2 |
| A0:B1:C2:D3:E4:F5 | Port 3 |
| 20:30:40:50:60:70 | EXTERNAL PROCESSING UNIT |
| 00:01:02:03:04:05 | EXTERNAL PROCESSING UNIT |

(a)

114

1130        1131

| MAC ADDRESS | TRANSFER DESTINATION |
|---|---|
| 1A:2B:3C:4D:5E:6F | Port 2 |
| A0:B1:C2:D3:E4:F5 | Port 3 |
| 20:30:40:50:60:70 | EXTERNAL PROCESSING UNIT |
| 00:01:02:03:04:05 | INTERNAL PROCESSING UNIT |

(b)

127

| MAC ADDRESS | TRANSFER DESTINATION |
|---|---|
| 00:01:02:03:04:05 | INTERNAL PROCESSING UNIT |

125

| IP ADDRESS | TRANSFER MAC ADDRESS |
|------------|----------------------|
| 255.255.1.3 | 1A:2B:3C:4D:5E:6F |
| 192.168.1.5 | A0:B1:C2:D3:E4:F5 |

231

| IP ADDRESS | TRANSFER MAC ADDRESS |
|---|---|
| 2300 | 2301 |
| 255.255.255.192 | 1A:2B:3C:4D:5E:6F |
| 192.128.1.2 | A0:B1:C2:D3:E4:F5 |
| 255.255.1.3 | 1A:2B:3C:4D:5E:6F |
| 192.168.1.5 | A0:B1:C2:D3:E4:F5 |

*FIG. 8*

ELECTRONIC CONTROL DEVICE AND CALCULATION METHOD

TECHNICAL FIELD

The present invention relates to an electronic control device and a calculation method.

BACKGROUND ART

An in-vehicle network is connected to an external network such as the Internet or a wireless LAN, so that convenience of a user is improved, but it is pointed out that there is a risk that an electronic control device is hijacked by a cyberattack from outside the vehicle. Therefore, in order to prove that an automobile is safe, it is desirable to operate a function after it is confirmed at the time of activating the automobile that a program in the automobile is not falsified. In addition, it is desired to operate the function early from the viewpoint of convenience of the user. As a method of verifying the safety of the program, a method of comparing whether a signature value created in advance matches a signature value created from the current program is generally known, and a method of activating the program after verifying the safety is called secure boot. When this secure boot is performed, it is inevitable that a longer time is required for activation than before. PTL 1 discloses a secure boot method in which a computer executes, every time a program of a system is activated, a selection step of selecting a different partial program to be verified for a hash value from among a plurality of partial programs obtained by dividing the program, a calculation step of calculating the hash value of the selected partial program, and a verification step of determining whether or not the calculated hash value matches a correct part hash value which is a correct hash value of each of the plurality of partial programs, continuing an activation process of the system in a case where the calculated hash value matches the correct part hash value, and interrupting the activation process of the system in a case where the calculated hash value does not match the correct part hash value.

CITATION LIST

Patent Literature

PTL 1: JP 2015-022521 A

SUMMARY OF INVENTION

Technical Problem

In the invention described in PTL 1, communication data cannot be processed before the activation process is completed.

Solution to Problem

An electronic control device according to a first aspect of the present invention is an electronic control device including: a first processing unit; a second processing unit; and a transfer control unit. The second processing unit requires a longer time for an activation process than the first processing unit, the transfer control unit includes a communication unit capable of transferring communication data received from an outside to the first processing unit and the second processing unit, the first processing unit includes a first control part that processes the communication data transferred from the transfer control unit, the second processing unit includes a second control part that processes the communication data transferred from the transfer control unit, and the transfer control unit does not set the second processing unit as a transfer destination of the communication data and sets the first processing unit to be included in the transfer destination until the activation process of the second processing unit is completed and sets at least the second processing unit as the transfer destination of the communication data when the activation process of the second processing unit is completed.

A calculation method according to a second aspect of the present invention is a calculation method executed by an electronic control device including a first processing unit, a second processing unit, and a transfer control unit. The second processing unit requires a longer time for an activation process than the first processing unit, the transfer control unit is capable of transferring communication data received from an outside to the first processing unit and the second processing unit. The method includes: causing a first control part to process the communication data transferred from the transfer control unit; causing a second control part to process the communication data transferred from the transfer control unit; and causing the transfer control unit not to set the second processing unit as a transfer destination of the communication data and to set the first processing unit to be included in the transfer destination until the activation process of the second processing unit is completed, and to set at least the second processing unit as the transfer destination of the communication data when the activation process of the second processing unit is completed.

Advantageous Effects of Invention

According to the present invention, the received communication data can be processed even before the activation process is completed.

BRIEF DESCRIPTION OF DRAWINGS

FIG. 1 is a configuration diagram of an electronic control device according to a first embodiment.
FIG. 8 is a configuration diagram of an electronic control device according to a second embodiment.

DESCRIPTION OF EMBODIMENTS

First Embodiment

Figure 2:
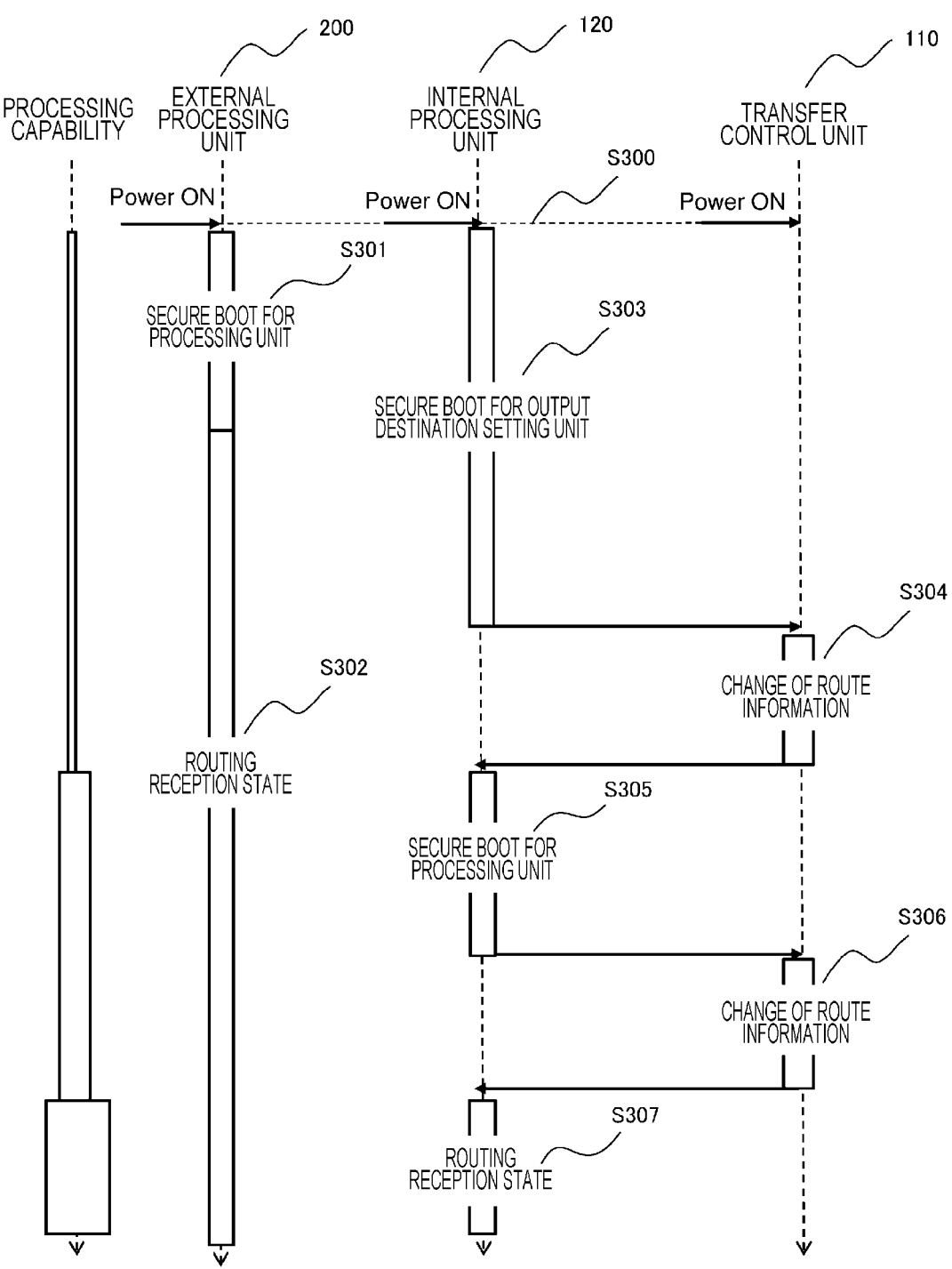
FIG. 2 is a sequence diagram of the electronic control device according to the first embodiment.

Hereinafter, a first embodiment of an electronic control device will be described with reference to FIGS. 1 to 7.

Figure 1:
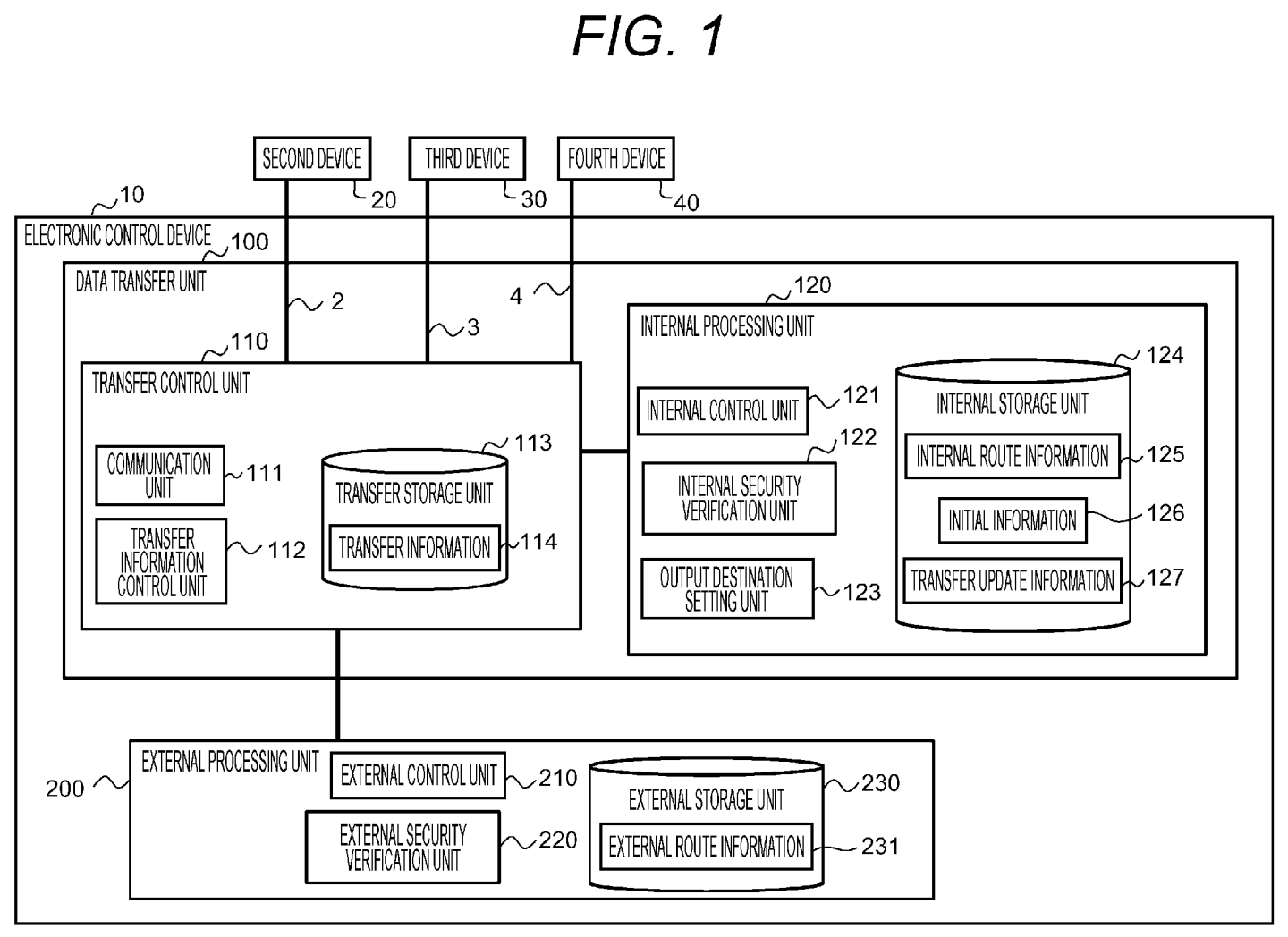

FIG. 1 is a configuration diagram of an electronic control device 10 according to the first embodiment. The electronic control device 10 includes a data transfer unit 100 and an external processing unit 200. The data transfer unit 100 includes a transfer control unit 110 and an internal processing unit 120. The data transfer unit 100 includes a switch. The transfer control unit 110 includes a communication unit 111, a transfer information control unit 112, and a transfer storage unit 113. The transfer control unit includes a switch core. Transfer information 114 is stored in the transfer storage unit 113. Furthermore, the internal processing unit 120 includes an internal control unit 121, an internal security verification unit 122, an output destination setting unit 123, and an internal storage unit 124. The internal storage unit 124 stores internal route information 125, initial information 126, and transfer update information 127.

The external processing unit 200 includes an external control unit 210, an external security verification unit 220, and an external storage unit 230. External route information 231 is stored in the external storage unit 230. Note that, hereinafter, the external processing unit 200 may be referred to as a "first processing unit", and the external security verification unit 220 may be referred to as a "first security verification unit". The first processing unit includes an internal processor of the switch. In addition, the internal processing unit 120 may be referred to as a "second processing unit", and the internal security verification unit 122 may be referred to as a "second security verification unit". The second processing unit includes a microcomputer.

The electronic control device 10 implements the internal control unit 121, the output destination setting unit 123, and the external control unit 210 as follows. That is, the electronic control device 10 implements the internal control unit 121, the output destination setting unit 123, and the external control unit 210 by a CPU (not illustrated), which is a central processing unit, developing a program recorded in a rewritable storage area (not illustrated) into a random access memory (RAM) (not illustrated) and executing the program. This means that there is a possibility that the internal control unit 121, the output destination setting unit 123, and the external control unit 210 are falsified by a third party. Therefore, it is necessary to confirm a program for implementing these functional blocks before the activation by using the first security verification unit and the second security verification unit.

The electronic control device 10 is connected to communication buses 2, 3, and 4 via a plurality of communication ports (not illustrated) included in the transfer control unit 110. In addition, the communication bus 2 is connected to a second device 20, the communication bus 3 is connected to a third device 30, and the communication bus 4 is connected to a fourth device 40. Hereinafter, the second device 20, the third device 30, and the fourth device 40 may be collectively referred to as "each device".

Here, before describing each functional configuration of the electronic control device 10, an assumed connection configuration of the electronic control device 10 will be described. The electronic control device 10 is a switch in a data link layer or a network layer, a so-called L2 switch or L3 switch. The second device 20, the third device 30, and the fourth device 40 are each an electronic control unit (ECU) or a gateway device mounted on one certain vehicle. The communication standards of the communication buses 2, 3, and 4 are not particularly limited, and for example, CAN (registered trademark), LIN (registered trademark), IEEE 802.3, and the like can be used. The communication bus may be connected not only to the second device 20 but also to other electronic control devices to construct a bus type or a star type network. In the following description, as an example, it is assumed that IEEE 802.3 is used for the communication buses 2, 3, and 4.

In the present embodiment, a digital signal output from each device to the communication bus is referred to as "communication data". Although a specific name of the communication data varies depending on a communication protocol, for example, a frame, a datagram, a packet, or the like corresponds to the communication data.

Next, each function of the electronic control device 10 illustrated in FIG. 1 will be described. The electronic control device 10 has a function of transferring the communication data transmitted from the second device 20, the third device 30, and the fourth device 40 to an appropriate device. As described below, which of the transfer control unit 110, the internal processing unit 120, and the external processing unit 200 serves a main role in the transfer of the communication data depends on a situation and the content of the communication data.

The transfer control unit 110 includes the communication unit 111, the transfer information control unit 112, and the transfer storage unit 113. The transfer control unit 110 transfers the communication data received at a certain communication port to another communication port. However, the communication port of the transfer destination may be determined by the transfer control unit 110 or may be determined by the internal processing unit 120 or the external processing unit 200. The communication unit 111 and the transfer information control unit 112 are configured by a hardware circuit, and there is no risk of falsification. Unlike the internal processing unit 120 and the external processing unit 200, it is not necessary to confirm the safety of the communication unit 111 and the transfer information control unit 112 at the time of activation.

The communication unit 111 transmits and receives communication data from the second device 20, the third device 30, the fourth device 40, the internal processing unit 120, and the external processing unit 200. The transfer destination of the received communication data is instructed from the transfer information control unit 112. The transfer information control unit 112 determines the transfer destination of the communication data received by the communication unit 111 with reference to the transfer information 114, and gives an instruction on the transfer destination of the received communication data to the communication unit 111. The transfer storage unit 113 is a volatile or nonvolatile storage area.

The transfer information 114 stores data regarding the transfer destination of the received communication data. As will be described later, the transfer information 114 is rewritten by the output destination setting unit 123 of the internal processing unit 120. The transfer destinations in the present embodiment include the internal processing unit 120, the external processing unit 200, the second device 20, the third device 30, and the fourth device 40. A data structure of the transfer information 114 will be described later with reference to FIG. 4.

The internal processing unit 120 has a function of rewriting the transfer destination of the received communication data. For example, the internal processing unit 120 is mounted on an internal processor of the switch. The internal control unit 121 and the output destination setting unit 123 are implemented by the CPU developing a program stored in a nonvolatile storage area, for example, the internal storage unit 124 in the RAM and executing the program. The internal security verification unit 122 is implemented by a hardware circuit, or is implemented by reading a program stored in a non-rewritable area such as a ROM or an OTP (One Time Program) area into the RAM.

The internal control unit 121 rewrites the transfer destination described in the communication header of the received communication data on the basis of the internal route information 125, and transmits the communication data to the transfer control unit 110.

The internal security verification unit 122 has a function of confirming that the programs and data stored in the internal processing unit 120 are not falsified. Note that the programs and data of the internal processing unit 120 are used after the presence or absence of falsification is confirmed by the internal security verification unit 122 before the program is activated or before the data is read, and the safety is confirmed. For example, the internal security verification unit 122 calculates the hash value of the program for implementing the internal control unit 121, and determines that there is no falsification in a case where the signature value matches a value recorded in advance, and determines that there is falsification in a case where the hash value does not match the value recorded in advance. However, the hash value created in advance needs to be stored in a read-only memory such as a hardware security module (HSM).

The output destination setting unit 123 performs writing on the transfer storage unit 113 of the transfer control unit 110, and creates and updates the transfer information 114. The initial information 126 and the transfer update information 127 stored in the internal storage unit 124 are used to create and update the transfer information 114. The internal storage unit 124 is a volatile or nonvolatile storage area. When the internal storage unit 124 is volatile, the internal route information 125, the initial information 126, and the transfer update information 127 stored in a nonvolatile storage area (not illustrated) are read into the internal storage unit 124 when the electronic control device 10 is activated.

The internal route information 125 is used by the internal control unit 121 to rewrite the transfer destination of the communication data. The initial information 126 is information regarding the transfer destination of the communication data. The initial information 126 is written in the transfer storage unit 113 through the output destination setting unit 123. As a result, the transfer information 114 is created as described later. The initial information 126 has the same data structure as the transfer information 114. The transfer update information 127 stores data necessary for rewriting the transfer destination of the communication data, and is used to update the transfer information 114.

Similarly to the internal processing unit 120, the external processing unit 200 rewrites the transfer destination of the received communication data. The external processing unit 200 is mounted on a microcomputer and has a small size compared to the internal processing unit 120. Therefore, although the external processing unit 200 has a lower processing capability than the internal processing unit 120, the activation process is completed earlier than the internal processing unit 120. On the basis of the external route information 231, the external control unit 210 rewrites the transfer destination described in the communication header of the received communication data, and transmits the communication data to the transfer control unit 110.

The external security verification unit 220 has a function similar to that of the internal security verification unit 122, and has a function of confirming that the programs and data stored in the external processing unit 200 are not falsified. Note that, hereinafter, the external security verification unit 220 and the internal security verification unit 122 confirming that the program and data are not falsified and making the program and data available is also referred to as "secure boot". The external route information 231 is information necessary for rewriting the transfer destination of the received communication data. The external route information 231 has a structure similar to as that of the internal route information 125.

FIG. 2 is a sequence diagram for explaining a flow of the processing of the electronic control device 10. The process illustrated in FIG. 2 is executed by the electronic control device 10. The activation process of the internal processing unit 120 is divided into two stages, and the first half is referred to as a "first activation process" and the second half is referred to as a "second activation process". First, in step S300, the power supply of the electronic control device 10 is turned on, and electricity is supplied to the internal processing unit 120, the external processing unit 200, and the transfer control unit 110. At the left end of FIG. 2, a time-series change in a processing capability of the electronic control device 10 processing the communication data is illustrated. This processing capability indicates that the processing capability increases when a width in a lateral direction in the drawing increases.

In step S301, the external security verification unit 220 verifies whether the program and data of the external processing unit 200 is falsified. When the verification by the external security verification unit 220 is completed, the external processing unit 200 proceeds to step S302 and activates the program to transition to a state where the transfer process of the communication data can be performed, that is, a routing reception state. In the routing reception state, when the communication data is received, the external control unit 210 rewrites the transfer destination of the communication header on the basis of the external route information 231 and transmits the communication data to the communication unit 111 of the transfer control unit 110, thereby transferring the communication data to another device.

In step S303 which is the first activation process of the internal processing unit 120, the internal security verification unit 122 performs safety-verification on not the entire internal processing unit 120 but the program and data relevant to the setting of the transfer information 114 of the transfer control unit 110, and activation is performed. Specifically, the secure boot is performed on the output destination setting unit 123 and the initial information 126 of the internal processing unit 120. When the output destination setting unit 123 and the initial information 126 become available, the internal processing unit 120 proceeds to step S304.

In step S304, the output destination setting unit 123 writes the initial information 126 in the transfer storage unit 113 of the transfer control unit 110 to generate the transfer information 114. In the transfer information 114 generated in step S304, the external processing unit 200 is set as one transfer destination, and the communication data received by the transfer control unit 110 can be transferred to the external processing unit 200. Since the external processing unit 200 is in the routing reception state, the external processing unit operates a routing function. In the transfer information 114 generated in step S304, the internal processing unit 120 is not included in the transfer destination.

When the writing to the transfer storage unit 113 by the output destination setting unit 123 ends, the internal processing unit 120 proceeds to step S305. In step S305 which is the second activation process of the internal processing unit 120, the internal security verification unit 122 performs the secure boot on the remaining programs and data which are not subjected to the secure boot in step S303 described above. Specifically, the internal security verification unit 122 performs the secure boot on the internal control unit 121, the internal route information 125, and the transfer update information 127. When the secure boot is completed, the process proceeds to step S306.

In step S306, the output destination setting unit 123 of the internal processing unit 120 updates the transfer information 114 by writing the transfer update information 127 in the transfer storage unit 113. With this update, the internal processing unit 120 is included in the transfer destination of the transfer information 114. In step S307, the internal processing unit 120 transitions to a state where the transfer process of the communication data can be performed, that is, the routing reception state, and transfers the communication data received from the transfer control unit 110 according to the transfer information 114.

The time-series change in the processing capability of the electronic control device 10 illustrated in the left end of FIG. 2 will be described. Since the communication data cannot be processed until step S304 is completed, the processing capability is zero. When step S304 is completed, the transfer control unit 110 and the external processing unit 200 can process the communication data. When step S306 is completed, the transfer control unit 110, the external processing unit 200, and the internal processing unit 120 can process the communication data, so that the processing capability is enhanced.

Figure 3:
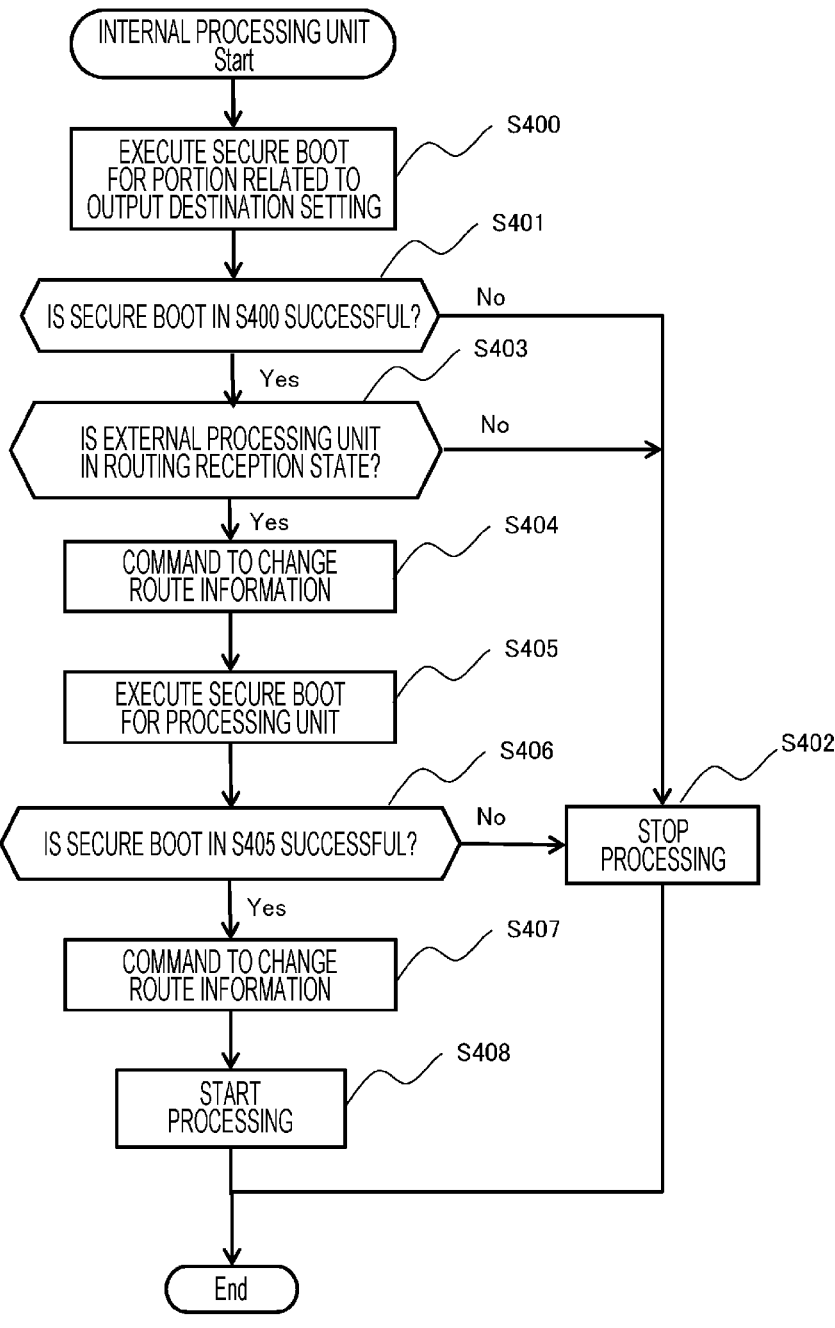
FIG. 3 is a flowchart illustrating processing of an internal processing unit.

FIG. 3 is a flowchart illustrating a detailed processing procedure of the internal processing unit 120. When power supply is input to the internal processing unit 120, step S400 is started. In step S400, the internal security verification unit 122 executes the secure boot and confirms that the function related to the writing to the transfer information 114 of the transfer control unit 110 is not falsified. Specifically, the secure boot is performed on the output destination setting unit 123 and the initial information 126 of the internal processing unit 120.

In subsequent step S401, the internal processing unit 120 confirms whether or not the secure boot performed in step S400 is successful, and activation is possible. In a case where it is determined that the secure boot fails, the internal processing unit 120 proceeds to step S402, stops the processing, and ends the process of FIG. 3. In a case where it is determined that the secure boot is successful, the internal processing unit 120 proceeds to step S403.

In step S403, the internal processing unit 120 confirms whether the secure boot of the external processing unit is completed and the external processing unit 200 is already in the routing reception state. Note that this step may be skipped depending on the situation, for example, in a case where it is known that the secure boot of the external processing unit 200 is completed in a shorter time than the secure boot of the internal processing unit 120 is completed, or in a case where it is desired to activate the transfer function in a shorter time. In a case where it is determined that the external processing unit 200 is in the routing reception state, the internal processing unit 120 proceeds to step S404. In a case where it is determined that the external processing unit 200 is not in the routing reception state, the internal processing unit 120 proceeds to step S402, stops the processing, and ends the process of FIG. 3.

In step S404, the output destination setting unit 123 writes the information of the initial information 126 in the transfer storage unit 113 of the transfer control unit 110 to create the transfer information 114. When the creation of the transfer information 114 is completed, the communication data received by the transfer control unit 110 can be transferred to the external processing unit 200. Therefore, the transfer function is already in operation when step S404 is completed.

In subsequent step S405, the internal security verification unit 122 executes the secure boot on the remaining programs and data, which are not verified for safety in step S400, of the internal processing unit 120. Specifically, the secure boot is performed on the internal control unit 121, the internal route information 125, and the transfer update information 127.

In subsequent step S406, the internal processing unit 120 confirms whether or not the secure boot performed in step S405 is successful. In a case where it is determined that the secure boot is successful, the internal processing unit 120 proceeds to step S407, and in a case where it is determined that the secure boot fails, the internal processing unit proceeds to step S402, stops the processing, and ends the process of FIG. 3.

In step S407, the output destination setting unit 123 updates the transfer information 114 when the output destination setting unit 123 writes the information of the transfer update information 127 in the transfer storage unit 113 of the transfer control unit 110. In subsequent step S408, the internal processing unit 120 enters the routing reception state, the communication data received by the transfer control unit 110 can be processed, and the process illustrated in FIG. 3 ends.

Figure 4:
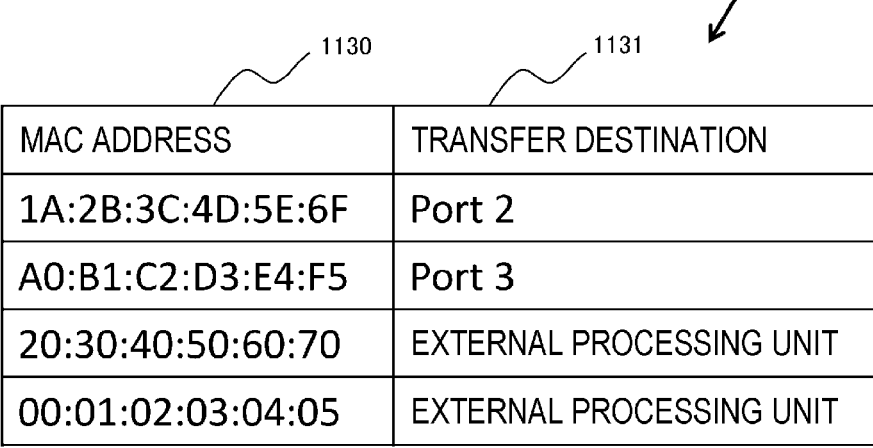
FIG. 4 is a diagram illustrating an example of transfer information.
Figure 4:
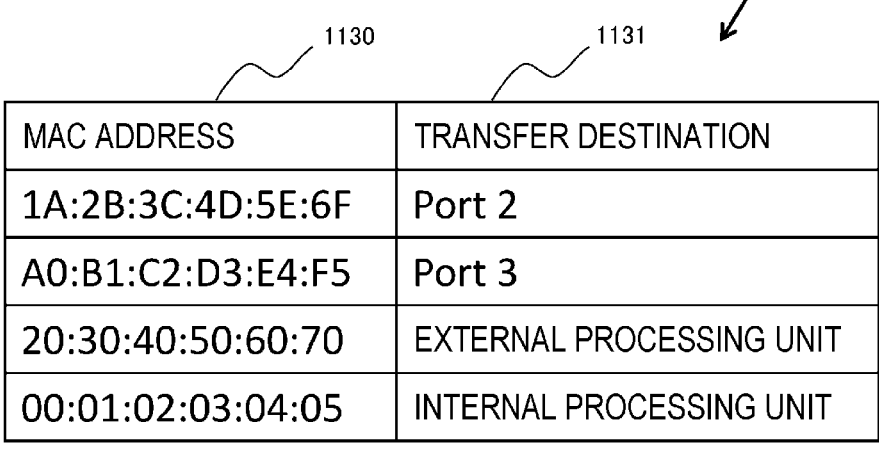

FIG. 4 is a diagram illustrating an example of the transfer information 114. FIG. 4(a) illustrates the transfer information 114 created by the process of step S304 of FIG. 2 or step S404 of FIG. 3. FIG. 4(b) illustrates the transfer information 114 created in step S306 of FIG. 2 or step S407 of FIG. 3. Hereinafter, the transfer information 114 illustrated in FIG. 4(a) is referred to as the "before-update" transfer information 114, and the transfer information 114 illustrated in FIG. 4(b) is referred to as the "after-update" transfer information 114.

The transfer information 114 includes a MAC address 1130 and a transfer destination 1131. The MAC address 1130 is used to identify the received communication data and investigate the registered transfer destination. In the transfer destination 1131, the transfer destination of the received communication data is described. For example, the port numbers connected to the internal processing unit 120, the external processing unit 200, the second device 20, and the third device 30 are described.

The communication data received before the update of the transfer information 114 is not transferred to the internal processing unit 120 but transferred to any device or the external processing unit 200. This is because the activation of the transfer function of the internal processing unit 120 is not completed, and thus the before-update transfer information 114 is created with the intention of avoiding transfer to the internal processing unit 120. In the communication data received by the transfer control unit 110 from the internal processing unit 120 and the external processing unit 200, the transfer destination MAC address included in the communication header is rewritten. Therefore, the transfer information control unit 112 refers to the transfer information 114 again to search for the transfer destination, and transmits the communication data to the corresponding transfer destination.

Although FIG. 4 illustrates the example in which the MAC address 1130 is used to identify the communication data, other values may be used as long as the transfer destination of the communication data can be determined. For example, the transfer destination may be determined by using a part of the value of the MAC address 1130 or using the IP address or a part thereof.

Figure 5:
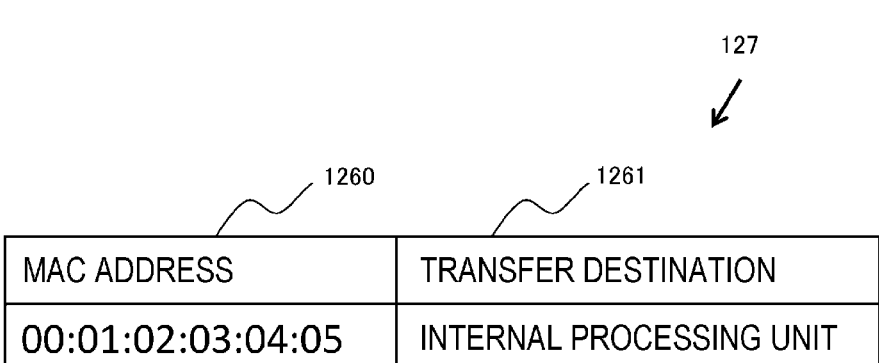
FIG. 5 is a diagram illustrating an example of transfer update information.

FIG. 5 is a diagram illustrating an example of the transfer update information 127. The transfer update information 127 is an updated portion of the transfer information 114, for example, a difference between FIGS. 4(a) and 4(b). The output destination setting unit 123 refers to the transfer information 114 stored in the transfer storage unit 113, and in a case where the MAC addresses of the transfer update information 127 matches the transfer information, updates the information stored in the transfer destination 1131 to the information of the transfer destination 1261. In the example of FIG. 5, the transfer destination of the MAC address "00:01:02:03:05" is updated to the internal processing unit 120. In the after-update transfer information 114 illustrated in FIG. 4(b), the processing is performed after the update in a distributed manner by the external processing unit 200 and the internal processing unit 120 in order to distribute the processing load of the communication data. However, after the update, the external processing unit 200 may not perform the transfer process of the communication data, and the internal processing unit 120 may process all the communication data.

Figure 6:
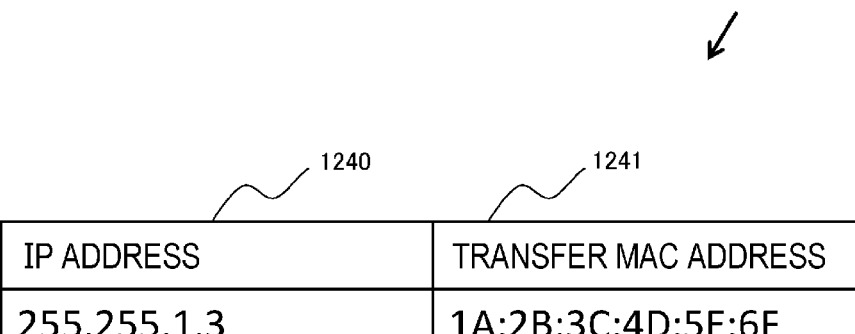
FIG. 6 is a diagram illustrating an example of internal route information.

FIG. 6 is a diagram illustrating an example of the internal route information 125. The internal route information 125 includes an IP address 1240 and a transfer MAC address 1241. The internal control unit 121 refers to the internal route information 125 to search for the MAC address of the transfer destination from the IP address included in the header of the received communication data, rewrites the header information to the searched MAC address, and transmits the communication data to the transfer control unit 110. For example, in a case where the communication data having a MAC address of "00:01:02:03:04:05" and an IP address of "255.255.1.3" is received, the transfer destination MAC address is searched for from the database, and the communication header is rewritten from "00:01:02:03:04: 05" to "1A:2B:3C:4D:5E:6F".

Figure 7:
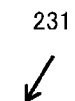
FIG. 7 is a diagram illustrating an example of external route information.

FIG. 7 is a diagram illustrating an example of the external route information 231. The data structure of the external route information 231 is the same as that of the internal route information 125 in FIG. 6. Since the external processing unit 200 needs to rewrite the transfer destination MAC address of the communication data also for the communication data received before the internal processing unit 120 operates, the external route information 231 has a larger data amount than the internal route information 125.

According to the first embodiment described above, the following operational effects can be obtained.

(1) The electronic control device 10 includes the external processing unit 200 (first processing unit), the internal processing unit 120 (second processing unit), and the transfer control unit 110. The internal processing unit 120 requires a longer time for the activation process than the external processing unit 200. The transfer control unit 110 can transfer the communication data received from the outside to the external processing unit 200 and the internal processing unit 120. As illustrated in FIG. 4(a), the transfer control unit 110 does not set the internal processing unit 120 as the transfer destination of the data but includes the external processing unit 200 as the transfer destination until the activation process of the internal processing unit 120 is completed, and sets at least the internal processing unit 120 as the transfer destination of the data when the activation process of the internal processing unit 120 is completed as illustrated in FIG. 4(b). Therefore, the communication data can be processed even before the internal processing unit 120 completes the activation process, and the processing capability for the communication data received at the time of activation is secured. In addition, when the activation process of the internal processing unit 120 is completed, the communication data is processed by using the internal processing unit 120, so that the processing capability is improved.

For example, it is also conceivable that the transfer control unit 110 does not process the communication data at all until the entire activation process of the internal processing unit 120 and the external processing unit 200 is completed. In that case, the processing capability is zero until the entire activation process is completed. On the other hand, in the present embodiment, since the communication data is processed by the transfer control unit 110 and the internal processing unit 120 even when the activation process of the external processing unit 200 is not completed, the processing can be started from the activation even though the processing capability is low. That is, in the present embodiment, a period in which the processing capability is zero can be shortened.

(2) The transfer control unit 110 includes the transfer storage unit 113 that stores the transfer information 114 which is correspondence information between an identifier of data and a transfer destination of data. The transfer control unit 110 refers to the transfer information 114 to determine the transfer destination of the data. In the transfer control unit 110, the transfer destination of the communication data is changed when the internal processing unit 120 rewrites the transfer information 114.

(3) When the activation process of the internal processing unit 120 is completed, the transfer control unit 110 transfers the data to one of the transfer destinations including the external processing unit 200 and the internal processing unit 120 with reference to the transfer information 114. Therefore, when the activation process of the internal processing unit 120 is completed, the transfer process of the communication data is executed using not only the external processing unit 200 but also the internal processing unit 120, so that the processing becomes faster.

(4) The internal processing unit 120 includes the internal security verification unit 122 (second security verification unit) that detects falsification. The internal processing unit 120 performs, as a part of the activation process, the detection of the falsification of at least one component configuring the internal processing unit 120 except the internal security verification unit 122 by using the internal security verification unit 122.

(5) The transfer control unit 110 includes the transfer storage unit 113 that stores the transfer information 114 which is correspondence information between an identifier of data and a transfer destination of data. The transfer control unit 110 refers to the transfer information 114 to determine the transfer destination of the data. The internal processing unit 120 includes the internal security verification unit 122 (second security verification unit) that detects falsification. The activation process of the internal processing unit 120 includes the first activation process in S303 of FIG. 2 and the second activation process in S305 of FIG. 2. In the first activation process, the internal security verification unit 122 detects falsification of a program for implementing the output destination setting unit 123 which rewrites the transfer information 114 and the initial information 126 which is information indicating that the internal processing unit 120 is not the transfer destination of data, and the output destination setting unit 123 writes the initial information 126 in the transfer storage unit 113. Therefore, it is possible to create the safe transfer information 114 confirmed to be not falsified by using the internal security verification unit 122.

First Modification

In the first embodiment described above, the data transfer unit 100 has been described as a configuration in which the transfer control unit 110 and the internal processing unit 120 are independent of each other. However, the transfer control unit 110 and the internal processing unit 120 may not be explicitly separated.

Second Modification

In the first embodiment described above, both the internal processing unit 120 and the external processing unit 200 perform the secure boot. However, at least one of the internal processing unit 120 and the external processing unit 200 may not perform the secure boot. A case where the secure boot does not need to be performed is, for example, a case where a program or data is stored in a read-only memory, a case where it is not necessary to consider a possibility of falsifying, or the like. Even in a case where the secure boot is not performed, the configuration of the present embodiment is effective in a case where the activation of the external processing unit 200 takes a longer time than that of the internal processing unit 120 due to, for example, a large data size of the program or data. That is, until the activation process of the external processing unit 200 taking a long time for the activation process is completed, the external processing unit 200 is one of the transfer destinations from the transfer control unit 110, and when the activation process of the external processing unit 200 is completed, the external processing unit 200 and the internal processing unit 120 are included in the transfer destinations from the transfer control unit 110, so that the processing of the communication data can be started before the activation process is completed.

Third Modification

In the first embodiment described above, the output destination setting unit 123 of the internal processing unit 120 performs writing on the transfer storage unit 113 of the transfer control unit 110. However, the internal processing unit 120 may transmit a write command to the transfer control unit 110, and the transfer control unit 110 may perform writing to the transfer storage unit 113. In this case, the initial information 126 and the transfer update information 127 are provided in the transfer control unit 110. The internal processing unit 120 transmits a rewrite command to the transfer control unit 110, and the transfer control unit 110 rewrites the transfer information 114 by itself.

Fourth Modification

In the first embodiment described above, when the activation process of the internal processing unit 120 is completed, the transfer information 114 is rewritten such that both the internal processing unit 120 and the external processing unit 200 are included in the transfer destination. However, when the activation process of the internal processing unit 120 is completed, the transfer information 114 may be rewritten such that the internal processing unit 120 is included in the transfer destination, but the external processing unit 200 is not included in the transfer destination. In this case, for example, when the activation process of the internal processing unit 120 is completed, the transfer information 114 is obtained by rewriting "external processing unit" in the third line of FIG. 4(b) to "internal processing unit". According to the present modification, when the activation process of the internal processing unit 120 is completed, the external processing unit 200 does not perform the transfer process of the communication data, so that the external processing unit 200 can execute another process.

Fifth Modification

In the first embodiment described above, the internal control unit 121 and the output destination setting unit 123 are implemented by a CPU (not illustrated) executing a program. However, the internal control unit 121 and the output destination setting unit 123 may be implemented by using a field programmable gate array (FPGA) which is a rewritable logic circuit. In a case where configuration data to be written in the FPGA is stored in a rewritable storage area, the internal security verification unit 122 detects falsification of the configuration data as a process of the secure boot. Similarly to the program, the internal security verification unit 122 calculates a signature value of the configuration data, and determines whether or not the configuration data is falsified on the basis of whether or not the signature value matches a value recorded in advance.

Note that the program and the configuration data are similar in terms of program codes for implementing the above-described functional blocks although the objects to be read are different. Hereinafter, the program and the configuration data are collectively referred to as "program implementation data". According to the fifth modification, even in a case where the FPGA is included in the configuration of the electronic control device 10, it is possible to obtain operational effects similar to those of the first embodiment.

Sixth Modification

In the first embodiment described above, a part of the communication data can be processed only by the transfer control unit 110. For example, the processing of the communication data having two MAC addresses from the top illustrated in FIG. 4(a) is completed only by the transfer control unit 110 without being transferred to the internal processing unit 120 or the external processing unit 200. However, the transfer control unit 110 may always transfer the communication data to the internal processing unit 120 or the external processing unit 200 instead of completing the processing only by the transfer control unit 110.

Seventh Modification

The internal control unit 121 and the external control unit 210 rewrite the header information of the received communication data. However, at least one of the internal control unit 121 and the external control unit 210 may not rewrite the header information of the received communication data. In this case, the internal control unit 121 and the external control unit 210 perform some processes using the communication data. This process is, for example, a process of determining whether or not the communication data conforms to a predetermined rule and discarding the communication data when the communication data does not conform to the predetermined rule.

Eighth Modification

The locations of the internal processing unit 120 and the external processing unit 200 may be switched. That is, the external processing unit 200 may be included in the data transfer unit 100, and the internal processing unit 120 may exist outside the data transfer unit 100.

Second Embodiment

A second embodiment of the electronic control device will be described with reference to FIGS. 8 to 10. In the following description, the same components as those of the first embodiment are denoted by the same reference numerals, and differences will be mainly described. The points not particularly described are the same as those in the first embodiment. The present embodiment is different from the first embodiment mainly in that there is no possibility of falsification of some programs.

Figure 8:
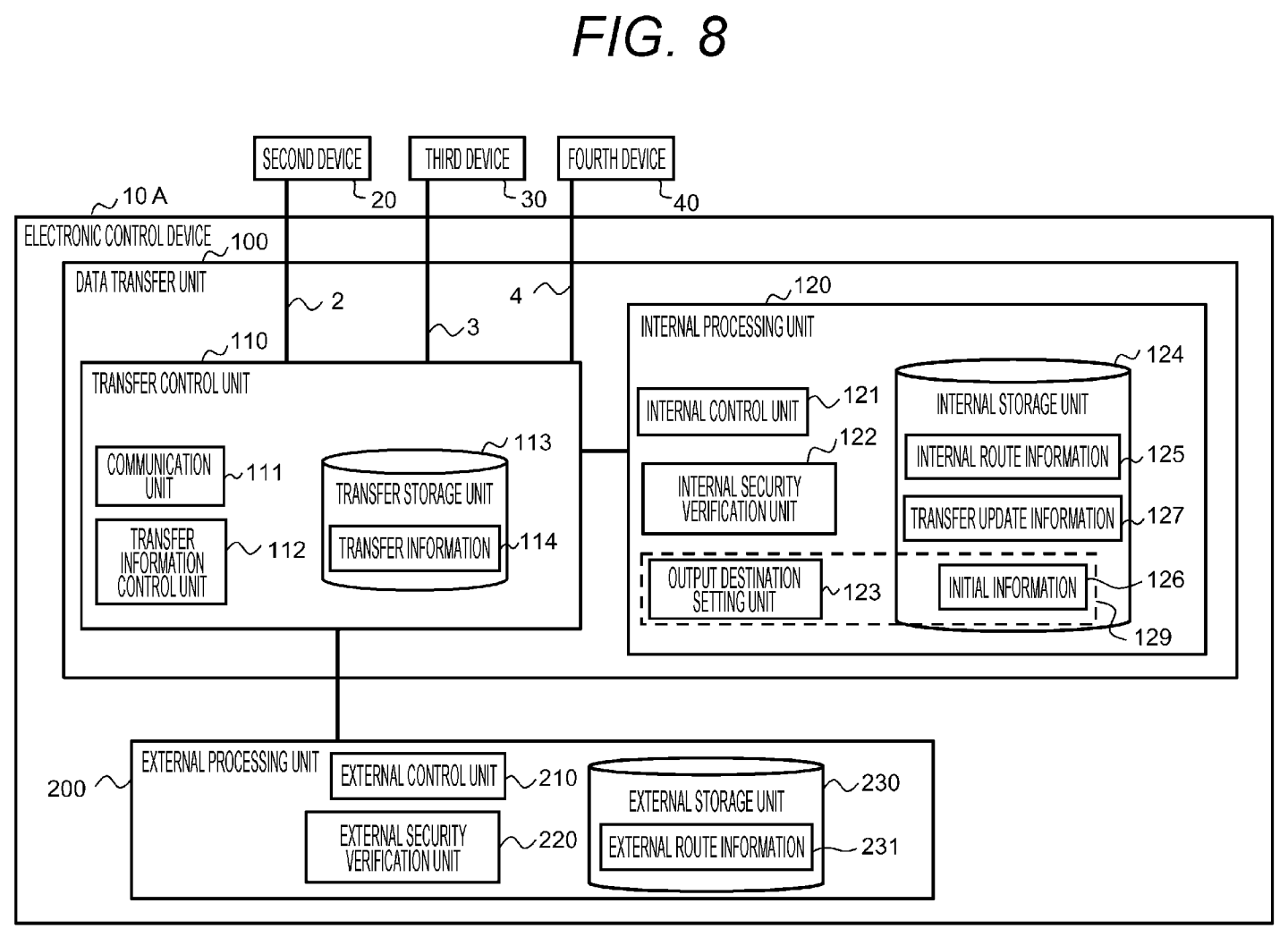

FIG. 8 is a configuration diagram of an electronic control device 10A according to the second embodiment. The same components as those of the electronic control device in the first embodiment are denoted by the same reference numerals, and the description thereof is omitted. In the present embodiment, the program for implementing the output destination setting unit 123 of the internal processing unit 120 and the initial information 126 are stored in a non-rewritable memory area 129 such as an HSM or a one time program (OTP) area. That is, a program for implementing the function necessary for writing to the transfer storage unit 113 of the transfer control unit 110 and information to be written in the transfer storage unit 113 are objects to be stored in the non-rewritable area.

Figure 9:
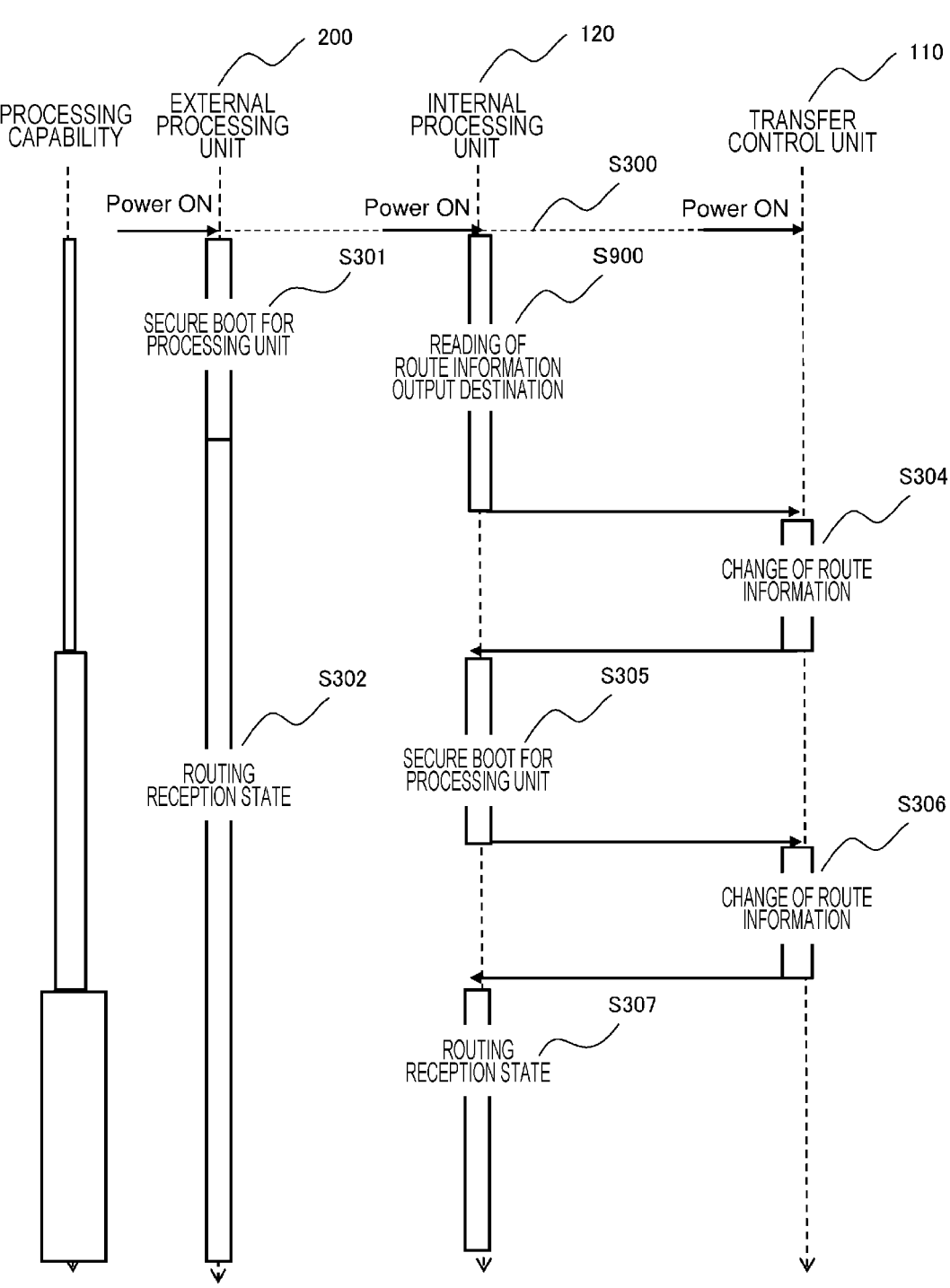
FIG. 9 is a sequence diagram of the electronic control device according to the second embodiment.

FIG. 9 is a sequence diagram illustrating the operation of the electronic control device 10A in the second embodiment. The processes similar to those in FIG. are denoted by the same reference numerals, and the description thereof is omitted. As compared with the sequence diagram of FIG. 2, the process immediately after the operation of the internal processing unit 120 is started, that is, the method of activating the function for writing to the transfer storage unit 113 of the transfer control unit 110 is different.

In step S900, the internal processing unit 120 performs a program for writing to the transfer storage unit 113, that is, the activation of the output destination setting unit 123 and the reading of the initial information 126. In the present embodiment, since the program for implementing the output destination setting unit 123 and the initial information 126 are stored in a non-writable area, and there is no risk of falsification, the verification by the internal security verification unit 122 can be omitted. Since subsequent processing is similar to that of the first embodiment, the description thereof is omitted.

Figure 10:
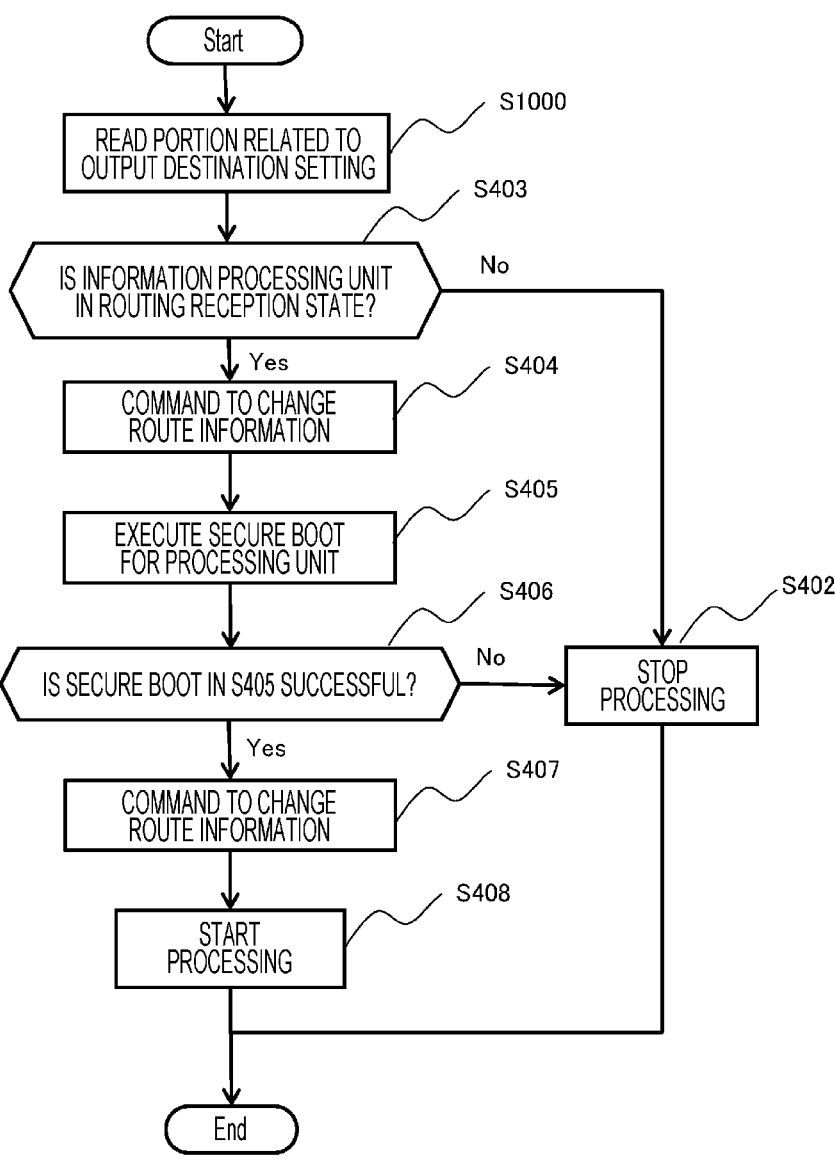
FIG. 10 is a flowchart illustrating processing of an internal processing unit in the second embodiment.

FIG. 10 is a flowchart illustrating processing of the internal processing unit 120 in the second embodiment. The processes similar to the steps illustrated in FIG. 3 are denoted by the same reference numerals, and the description thereof is omitted. Compared with FIG. 3, steps S400 and S401 are replaced with step S900.

In step S1000, since the program related to the writing of the transfer information 114 is stored in the HSM, and there is no risk of falsification, the portion related to the output destination is read and activated without performing the secure boot. Specifically, the output destination setting unit 123 and the initial information 126 are called.

According to the second embodiment described above, the following operational effects can be obtained.

(6) The transfer control unit 110 of the electronic control device 10A includes the transfer storage unit 113 that stores transfer information 114 which is correspondence information between an identifier of data and a transfer destination of data. The transfer control unit 110 refers to the transfer information 114 to determine the transfer destination of the data. The activation process of the internal processing unit 120 includes the first activation process and the second activation process. In the first activation process, the internal security verification unit 122 read, from a read-only area, a program code for implementing the output destination setting unit 123 which rewrites the transfer information 114 and the initial information 126 which is information indicating that the internal processing unit 120 is not the transfer destination of the data, and the output destination setting unit 123 writes the initial information 126 in the transfer storage unit 113. Therefore, in the present embodiment, since the internal security verification unit 122 does not require the secure boot of the output destination setting unit 123 and the initial information 126, the first process can be completed earlier than in the first embodiment.

Third Embodiment

A third embodiment of the electronic control device will be described with reference to FIGS. 11 and 12. In the following description, the same components as those of the first embodiment are denoted by the same reference numerals, and differences will be mainly described. The points not particularly described are the same as those in the first embodiment. The present embodiment is different from the first embodiment mainly in that the transfer information is rewritten at the time of ending.

Figure 11:
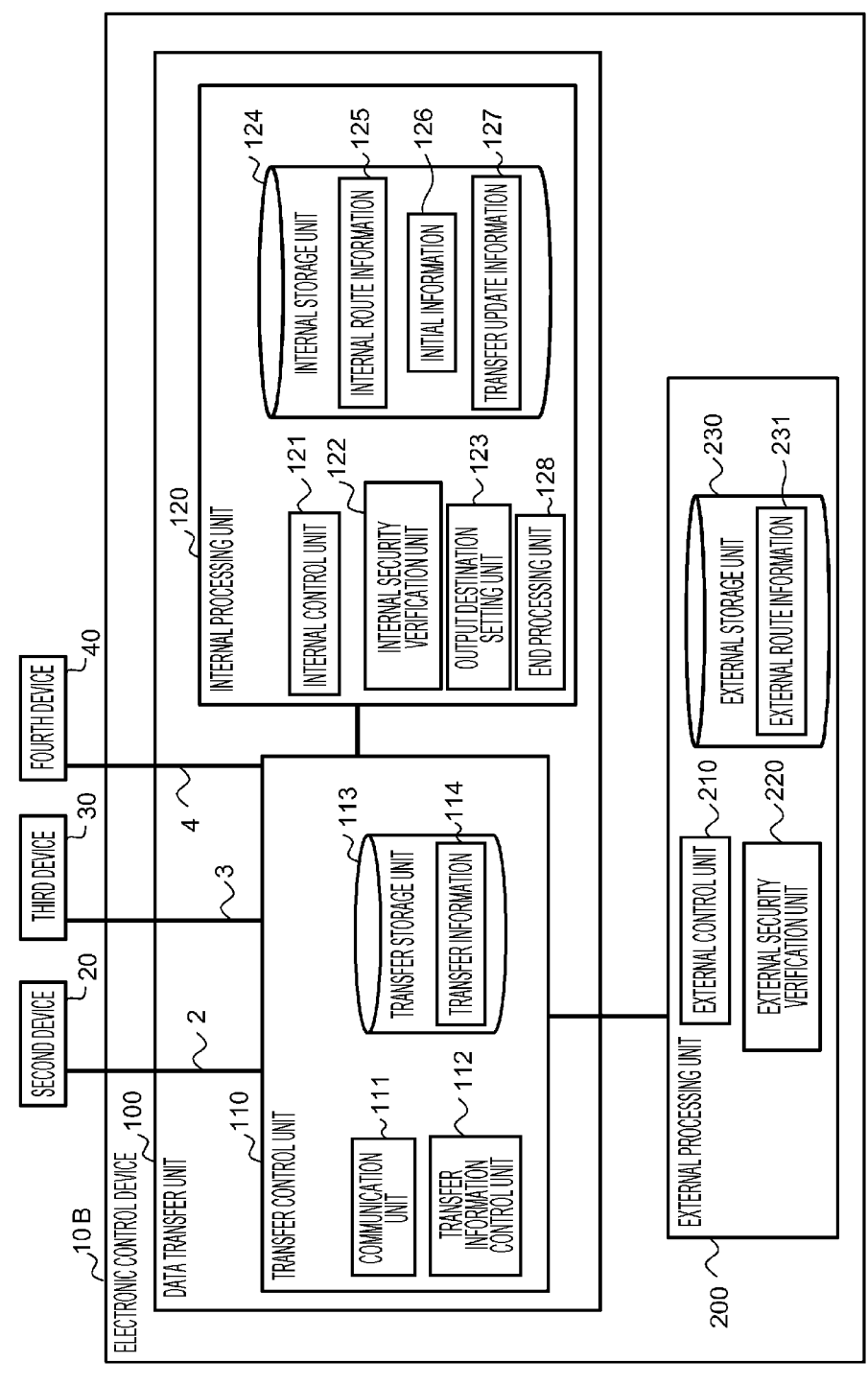
FIG. 11 is a configuration diagram of an electronic control device according to a third embodiment.

FIG. 11 is a configuration diagram of an electronic control device 10B according to the third embodiment. The same components as those of the electronic control device in the first embodiment are denoted by the same reference numerals, and the description thereof is omitted. In the present embodiment, the internal processing unit 120 further includes an end processing unit 128. In addition, the processing of the internal security verification unit 122 and the output destination setting unit 123 is different from that of the first embodiment. In the present embodiment, the transfer storage unit 113 is a nonvolatile storage device, for example, a flash memory, a phase change memory, a magnetic memory, or the like. Therefore, when power is supplied to the electronic control device 10B, the information stored when the power supply is stopped remains as it is in the transfer storage unit 113.

In the present embodiment, the electronic control device 10B receives an operation stop command signal before the power supply from the outside is stopped. When the operation stop command signal is input, the output destination setting unit 123 writes the initial information 126 in the transfer storage unit 113, and rewrites the transfer information 114 such that the internal processing unit 120 is not included in the transfer destination as illustrated in FIG. 4(a). After this rewriting, the power supply to the electronic control device 10B is stopped.

In the electronic control device 10B, when power is supplied, each of the internal processing unit 120 and the external processing unit 200 starts the secure boot. However, the internal security verification unit 122 of the internal processing unit 120 sets the internal control unit 121, the output destination setting unit 123, the internal route information 125, and the transfer update information 127 as the targets of the secure boot. That is, the initial information 126 is not the target of the secure boot at the time of activation. The initial information 126 is verified at a timing when the processing load after activation is low. When the secure boot is completed, the internal processing unit 120 writes the transfer update information 127 in the transfer storage unit 113 by using the output destination setting unit 123, thereby rewriting the transfer information 114 to the transfer destination including the internal processing unit 120 as illustrated in FIG. 4(b). When the rewriting is completed, the internal processing unit 120 transitions to the routing reception state.

Figure 12:
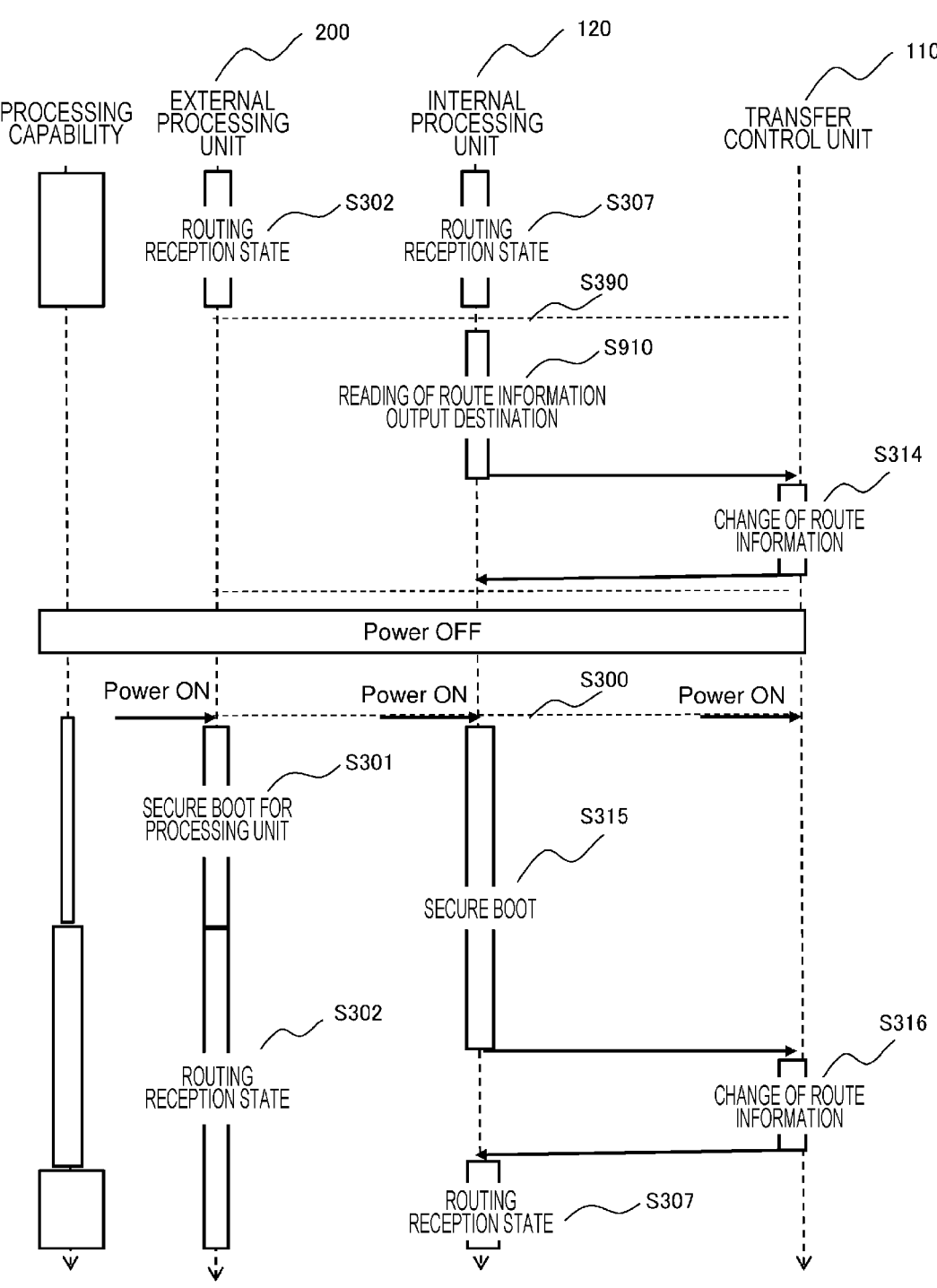
FIG. 12 is a sequence diagram of the electronic control device according to the third embodiment.

FIG. 12 is a sequence diagram illustrating the operation of the electronic control device 10B in the third embodiment. The processes similar to those in the first embodiment and the second embodiment are denoted by the same reference numerals, and the description thereof is omitted. In the upper part of the sequence diagram illustrated in FIG. 12, a certain time has elapsed since the activation of the electronic control device 10B, and both the internal processing unit 120 and the external processing unit 200 transition to the routing reception state. Note that the transfer information 114 at this time includes the internal processing unit 120 as the transfer destination as illustrated in FIG. 4(b).

In step S390, when the operation stop command signal is input, the output destination setting unit 123 of the internal processing unit 120 performs the following processing. That is, the output destination setting unit 123 reads the initial information 126 from the internal storage unit 124 in step S910, and writes the initial information in the transfer storage unit 113 of the transfer control unit 110 in step S314. After completion of the writing, the power supply to the internal processing unit 120 ends. Thereafter, in step S300, power is supplied to the internal processing unit 120. Similarly to the first embodiment, the external processing unit 200 performs the secure boot in step S301, and when the secure boot is completed, the external processing unit transitions to the routing reception state (step S302).

In a stage where step S301 is completed, the process corresponding to S304 in the first embodiment is completed by rewriting in step S314 immediately before the power supply is turned off. Therefore, when the external processing unit 200 transitions to the routing reception state in step S302, a routing process using the external processing unit 200 becomes possible.

According to the third embodiment described above, the following operational effects can be obtained.

(7) The transfer storage unit 113 is a nonvolatile storage area. The end processing unit 128 is provided which, as the ending process of the electronic control device 10B, rewrites the transfer information 114 such that the internal processing unit 120 is not included in the transfer destination. Therefore, the electronic control device 10B can start the processing of the transfer data earlier than in the first embodiment and the second embodiment.

Fourth Embodiment

A fourth embodiment of the electronic control device will be described with reference to FIGS. 13 and 14. In the following description, the same components as those of the first embodiment are denoted by the same reference numerals, and differences will be mainly described. The points not particularly described are the same as those in the first embodiment. The present embodiment is different from the first embodiment mainly in that the present embodiment is applied even to a case where either the internal processing unit or the external processing unit completes the activation process first.

Figure 13:
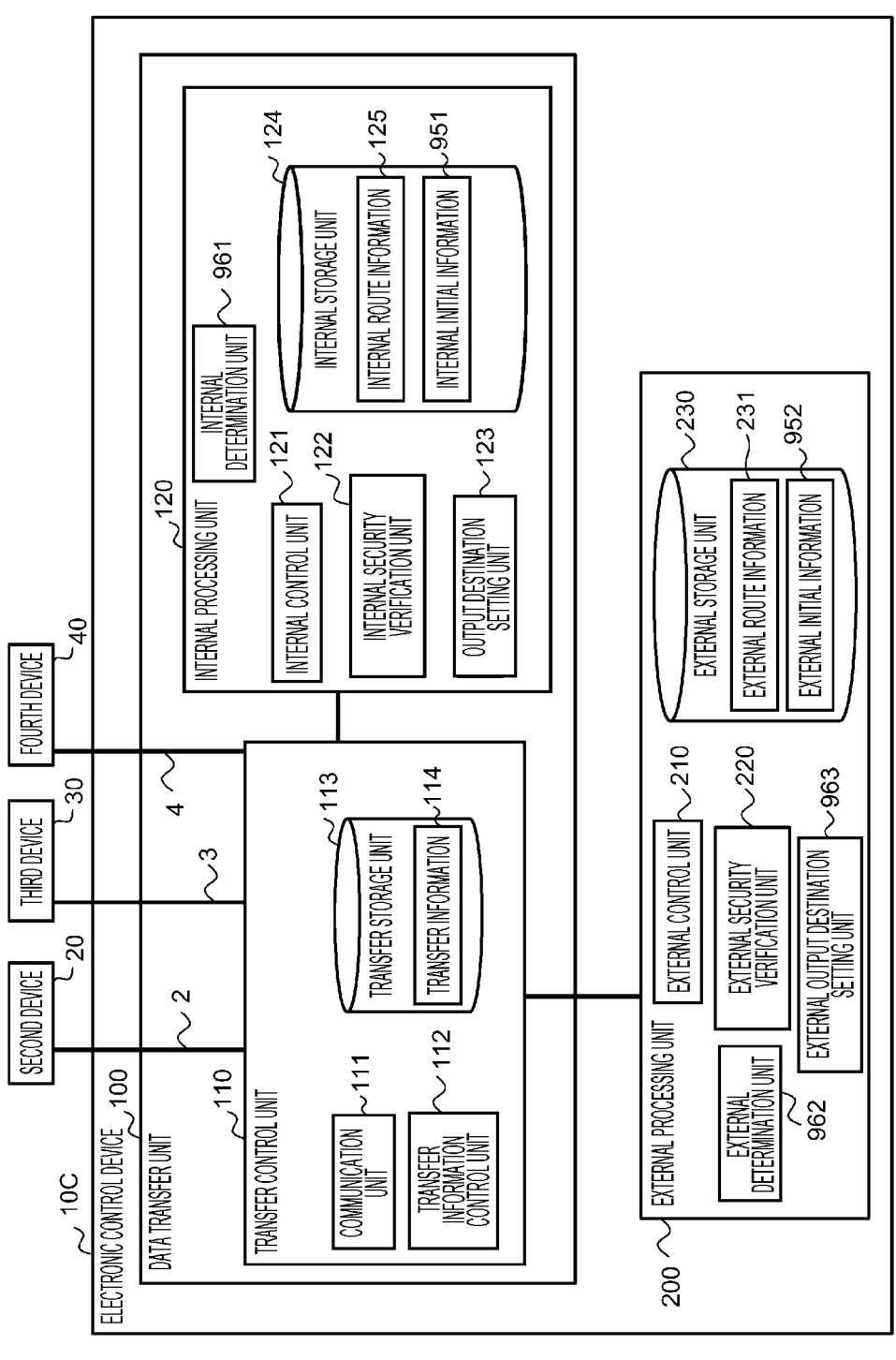
FIG. 13 is a configuration diagram of an electronic control device according to a fourth embodiment.

FIG. 13 is a configuration diagram of an electronic control device 10C in the fourth embodiment. The same components as those of the electronic control device 10 in the first embodiment are denoted by the same reference numerals, and the description thereof is omitted. The internal processing unit 120 in the present embodiment further includes an internal determination unit 961 in addition to the configuration in the first embodiment. Further, the internal storage unit 124 stores internal initial information 951 instead of the initial information 126. The external processing unit 200 in the present embodiment includes an external determination unit 962 and an external output destination setting unit 963 in addition to the configuration in the first embodiment. External initial information 952 is stored in the external storage unit 230.

The internal security verification unit 122 of the internal processing unit 120 performs the secure boot of the internal control unit 121, the output destination setting unit 123, the internal determination unit 961, the internal route information 125, and the internal initial information 951 at the time of activation. In the first embodiment, the internal processing unit 120 performs the secure boot in two stages, but in the present embodiment, all the secure boot is processed at once.

The external security verification unit 220 of the external processing unit 200 performs the secure boot of the external control unit 210, the external determination unit 962, the external output destination setting unit 963, the external route information 231, and the external initial information 952 at the time of activation.

The internal initial information 951 is data related to the transfer destination of the received communication data, the internal processing unit 120 is set to at least one of the transfer destinations, and the external processing unit 200 is not included in the transfer destination. The external initial information 952 is data related to the transfer destination of the received communication data, the external processing unit 200 is set to at least one of the transfer destinations, and the internal processing unit 120 is not included in the transfer destination. The external initial information 952 is, for example, as illustrated in FIG. 4(a).

When the secure boot of the internal processing unit 120 is completed, the internal determination unit 961 performs the following operation. The internal determination unit 961 determines whether or not the secure boot of the external processing unit 200 is completed. Whether or not the secure boot of the external processing unit 200 is completed may be determined, for example, by the internal determination unit 961 reading the contents of the transfer storage unit 113, or the determination may be implemented by the internal processing unit 120 and the external processing unit 200 mutually sending a signal indicating that the secure boot is completed.

When it is determined that the secure boot of the external processing unit 200 is not completed, the internal determination unit 961 writes the internal initial information 951 in the transfer storage unit 113 by using the output destination setting unit 123, and creates the transfer information 114 including the internal processing unit 120 as the transfer destination. When it is determined that the secure boot of the external processing unit 200 is completed, the internal determination unit 961 uses the output destination setting unit 123 to perform writing on the transfer storage unit 113 such that the transfer destination of the transfer information 114 is rewritten to include both the internal processing unit 120 and the external processing unit 200, for example, as in the state illustrated in FIG. 4(b).

When the secure boot of the external processing unit 200 is completed, the external determination unit 962 performs the following operation. The external determination unit 962 determines whether or not the secure boot of the internal processing unit 120 is completed. This determination can be implemented by a method similar to that of the internal determination unit 961. When it is determined that the secure boot of the internal processing unit 120 is not completed, the external determination unit 962 writes the external initial information 952 in the transfer storage unit 113 by using the external output destination setting unit 963, and creates the transfer information 114 including the external processing unit 200 as the transfer destination. When it is determined that the secure boot of the internal processing unit 120 is completed, the external determination unit 962 uses the external output destination setting unit 963 to perform writing on the transfer storage unit 113 such that the transfer destination of the transfer information 114 is rewritten to include both the internal processing unit 120 and the external processing unit 200, for example, as in the state illustrated in FIG. 4(b).

Figure 14:
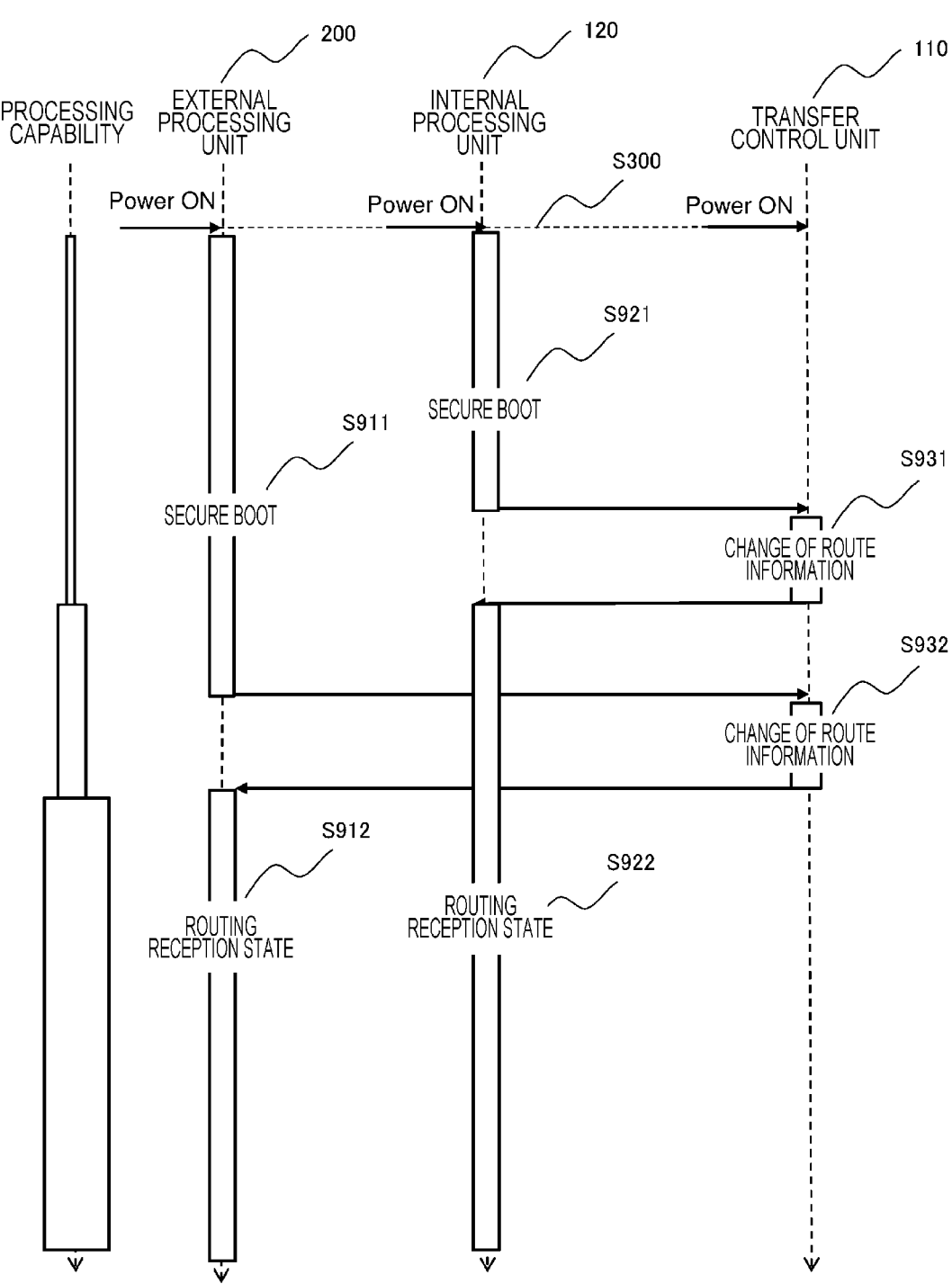
FIG. 14 is a sequence diagram of the electronic control device according to the fourth embodiment.

FIG. 14 is a sequence diagram for explaining a flow of processing of the electronic control device 10C in the fourth embodiment. Steps S911 and S921 are simultaneously started. In step S911, the external security verification unit 220 starts the secure boot. In step S921, the internal security verification unit 122 starts the secure boot. When the secure boot by the internal security verification unit 122 is completed, the internal determination unit 961 starts an operation, and determines whether or not the secure boot by the external processing unit 200 is completed. In the example illustrated in FIG. 14, the secure boot by the external processing unit 200 is not completed, and thus the internal determination unit 961 writes the internal initial information 951 in the transfer storage unit 113 in step S931, and transitions to the routing reception state in step S922.

When the secure boot 911 is completed, the external processing unit 200 determines that the secure boot of the internal processing unit 120 is already completed by the external determination unit 962. Then, the external determination unit 962 rewrites the transfer information 114 in step S932, and the external processing unit 200 transitions to the routing reception state in step S912.

According to the fourth embodiment described above, even in a case where either the internal processing unit 120 or the external processing unit 200 is activated first, it is possible to start the processing of the transfer data using the processing unit which is activated first.

In the present embodiment, the information described in the transfer information 114 changes depending on which of the internal processing unit 120 and the external processing unit 200 is activated first. However, the name of the configuration may be changed without changing the information described in the transfer information 114. For example, the internal processing unit 120 and the external processing unit 200 are temporarily read as a first calculation unit and a second calculation unit, and information to be written in the transfer information 114 is similar to that of the first embodiment. That is, the transfer destination of the transfer information 114 created first includes the external processing unit 200 but does not include the internal processing unit 120 as illustrated in FIG. 4(a).

The calculation unit which is activated first among the first calculation unit and the second calculation unit is referred to as the external processing unit 200, and the calculation unit which is activated later is referred to as the internal processing unit 120. The operation in the present embodiment can be expressed by changing the name in this manner. That is, the present embodiment can also be expressed as follows.

(8) In the electronic control device 10C, each of the internal processing unit 120 and the external processing unit 200 is either the first calculation unit or the second calculation unit. The electronic control device 10C includes determination units, that is, the internal determination unit 961 and the external determination unit 962 which rewrite the transfer information 114 with one calculation unit, in which the activation process is completed first, among the first calculation unit and the second calculation unit set as the external processing unit 200 and rewrite the transfer information 114 with another calculation unit, in which the activation process is completed later, among the first calculation unit and the second calculation unit set as the internal processing unit 120. Therefore, even in a case where either the internal processing unit 120 or the external processing unit 200 is activated first, it is possible to start the processing of the transfer data using the processing unit which is activated first.

In the above-described embodiments and modifications, the configuration of the functional block is merely an example. Some functional configurations illustrated as separate functional blocks may be integrally configured, or a configuration illustrated in one functional block diagram may be divided into two or more functions. In addition, some of the functions of each functional block may be included in another functional block.

The embodiments and modifications described above may be combined with each other. Although various embodiments and modifications have been described above, the present invention is not limited to these contents. Other embodiments considered within the scope of the technical idea of the present invention are also included within the scope of the present invention.

The disclosure of the following priority application is hereby incorporated by reference.

Japanese patent application 2019-208977 (filed on Nov. 19, 2019)

REFERENCE SIGNS LIST 10, 10A, 10B electronic control device
100 data transfer unit

110 transfer control unit
111 communication unit
112 transfer information control unit
113 transfer storage unit
114 transfer information
120 internal processing unit
121 internal control unit
122 internal security verification unit
123 output destination setting unit
124 internal storage unit
126 initial information
127 transfer update information
128 end processing unit
129 non-rewritable memory area
200 external processing unit
210 external control unit
220 external security verification unit
230 external storage unit
951 internal initial information
952 external initial information
961 internal determination unit
962 external determination unit
963 external output destination setting unit
The invention claimed is:

1. An electronic control device comprising:
a transfer controller that receives communication data from an external source, the transfer controller including a transfer storage that stores transfer information, wherein the transfer information includes correspondence information between an identifier of the communication data and a transfer destination of the communication data;
a first processor that receives the communication data transferred from the transfer controller and processes the communication data transferred from the transfer controller; and
a second processor that receives the communication data transferred from the transfer controller and processes the communication data transferred from the transfer controller, wherein the second processor is configured to perform an activation process over a greater amount of time, while having higher processing capability than the first processor;
wherein the transfer controller is configured to:
determine the transfer destination of the communication data with reference to the transfer information stored in the transfer storage and transfer the communication data received from the external source to the first processor or the second processor based on the transfer destination,
before the activation process of the second processor is complete, refrain from setting the second processor as the transfer destination of the communication data and set the first processor as the transfer destination, and
after the activation process of the second processor is complete, change the transfer destination by rewriting the transfer information of the communication data to include the second processor such that processing of the communication data is performed in a distributed manner by the first processor and the second processor.

2. The electronic control device according to claim 1, wherein the transfer storage is a nonvolatile storage area, the electronic control device further comprising:
an end processor configured to change the transfer destination, by rewriting the transfer information, to not include the second processor in response to completion of the processing of the communication data.

3. The electronic control device according to claim 1, wherein:
the second processor includes a second security verifier that detects falsification, and
the second processor performs, as a part of the activation process, detection of falsification of at least one component of the second processor using the second security verifier, wherein the second security verifier is configured to:
calculate a hash value of program implementation data for implementing the second processor,
determine that there is no falsification in a case where the hash value matches a pre-stored hash value, and
determine that there is falsification in a case where the hash value does not match the pre-stored hash value.

4. The electronic control device according to claim 1, wherein:
the second processor includes:
an output destination setter configured to:
rewrite the transfer information and initial information, the initial information being information indicating that the second processor is not the transfer destination of the communication data, and
write the initial information in the transfer storage; and
a second security verifier that detects falsification; and
the activation process of the second processor includes a first activation process,
in which the second security verifier is configured to detect falsification of program implementation data for implementing the output destination setter.

5. The electronic control device according to claim 1, wherein:
the transfer controller determines the transfer destination of the communication data with reference to the transfer information,
the activation process of the second processor includes a first activation process
in the first activation process in which, the second processor reads, from a read-only area, program implementation data for implementing an output destination setter, and
the output destination setter is configured to:
rewrite the transfer information and initial information which is information indicating that the second processor is not the transfer destination of the communication data, and
write the initial information in the transfer storage.

6. The electronic control device according to claim 1, further comprising a data transferer connected to the second processor, the data transferer comprising the first processor and the transfer controller.

7. The electronic control device according to claim 1, further comprising a data transferer connected to the first processor, the data transferer comprising the second processor and the transfer controller.

8. The electronic control device according to claim 6, wherein;
the data transferer is a switch in a data link layer or a network layer,
the transfer controller is a switch core,
the first processor is a microcomputer connected to the switch, and the second processor is an internal processor of the switch.

9. The electronic control device according to claim 7, wherein:

the data transferer is a switch in a data link layer or a network layer, the transfer controller is a switch core, the second processor is an internal processor of the switch, and the first processor is a microcomputer connected to the switch.

* * * * *